(12) United States Patent
Maier

(10) Patent No.: US 8,130,479 B2
(45) Date of Patent: *Mar. 6, 2012

(54) GROUND FAULT INTERRUPTS FOR SOLID STATE POWER CONTROLLERS

(75) Inventor: Josef Maier, Munningen (DE)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,564

(22) Filed: Sep. 15, 2009

(65) Prior Publication Data

US 2010/0002343 A1 Jan. 7, 2010

Related U.S. Application Data

(63) Continuation of application No. 11/478,906, filed on Jun. 30, 2006, now Pat. No. 7,609,492.

(51) Int. Cl.
*H02H 3/00* (2006.01)

(52) U.S. Cl. .......................................... 361/42

(58) Field of Classification Search ..................... 361/42
See application file for complete search history.

(56) References Cited

U.S. PATENT DOCUMENTS 3,721,862 A 3/1973 Brennen et al.
(Continued)

FOREIGN PATENT DOCUMENTS

JP 09163584 6/1997
(Continued)

*Primary Examiner* — Ronald E Leja
(74) *Attorney, Agent, or Firm* — Carlson, Gaskey & Olds, PC

(57) ABSTRACT

A solid state power control scheme is provided with a ground fault interrupt function. Essentially, if a neutral wire is associated with the power supply, the current is sensed in that neutral wire. The sensed neutral wire current is subtracted from a summed current on the power supply lines. If that result is greater than a predetermined limit, then the ground fault function is actuated and the circuit is opened. For power supplies, both those with and without neutral wires, the current is sensed by a shunt resistor on the power supply line.

5 Claims, 1 Drawing Sheet

U.S. PATENT DOCUMENTS

| | | | |
|---|---|---|---|
| 3,733,517 A | 5/1973 | Wilson | |
| 4,385,336 A * | 5/1983 | Takeshita et al. | 379/29.03 |
| 5,539,602 A * | 7/1996 | Schmitz et al. | 361/42 |
| 5,894,393 A | 4/1999 | Elliott et al. | |
| 6,421,214 B1 | 7/2002 | Packard et al. | |
| 6,678,137 B1 | 1/2004 | Mason et al. | |
| 6,958,463 B1 * | 10/2005 | Kochman et al. | 219/544 |
| 7,609,492 B2 * | 10/2009 | Maier | 361/42 |
| 2003/0174451 A1 * | 9/2003 | Boudreaux et al. | 361/42 |
| 2004/0141265 A1 | 7/2004 | Angle et al. | |
| 2005/0047035 A1 | 3/2005 | Vallinmaki et al. | |
| 2005/0052809 A1 | 3/2005 | Evans et al. | |
| 2005/0280422 A1 * | 12/2005 | Kishibata et al. | 324/522 |
| 2006/0002043 A1 | 1/2006 | DiSalvo et al. | |
| 2006/0125486 A1 | 6/2006 | Premerlani et al. | |
| 2006/0200688 A1 | 9/2006 | Tofigh et al. | |

FOREIGN PATENT DOCUMENTS

JP    2003199356 A  *  7/2003

\* cited by examiner

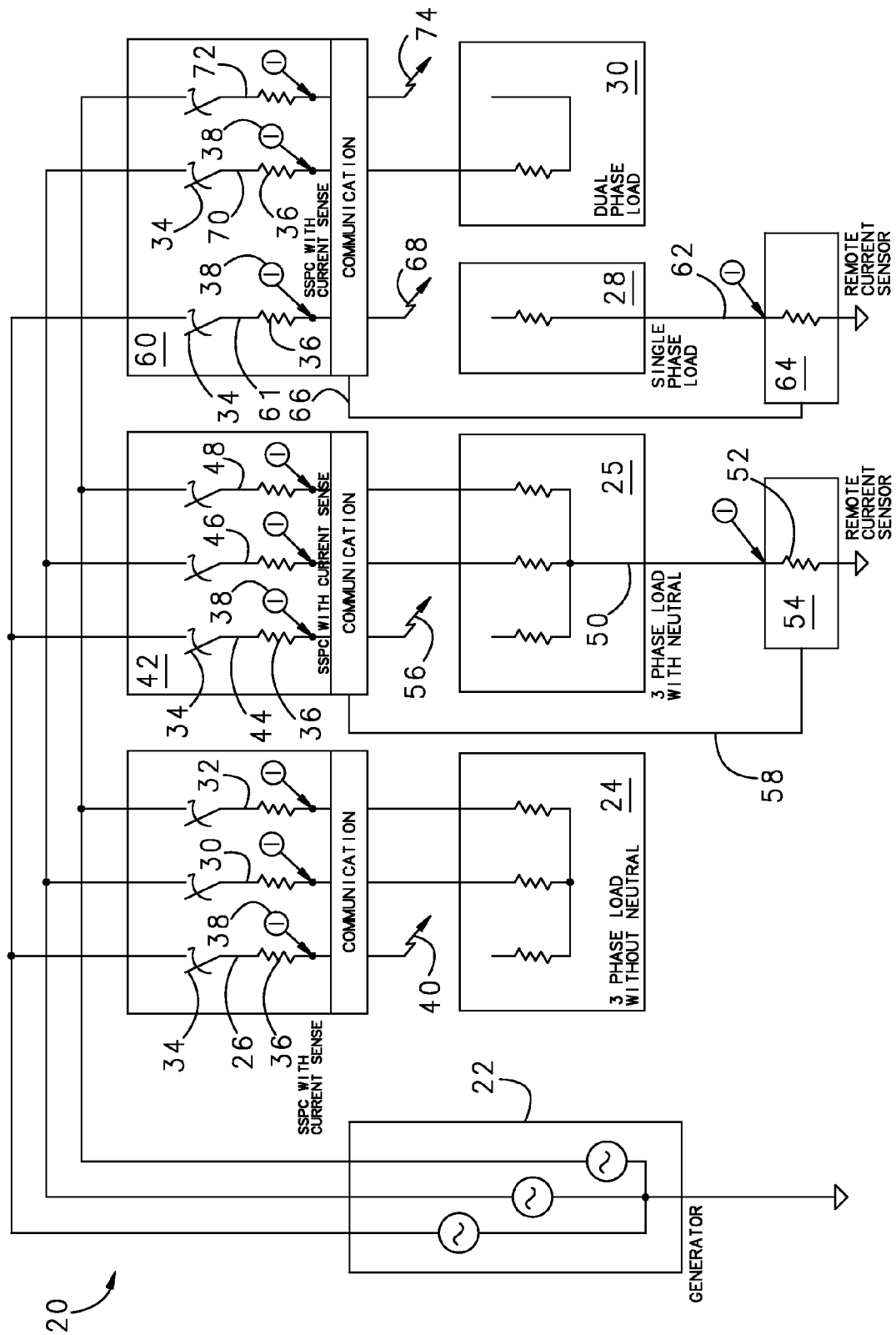

GROUND FAULT INTERRUPTS FOR SOLID STATE POWER CONTROLLERS

RELATED APPLICATION

This application is a continuation of U.S. patent application Ser. No. 11/478,906, which was filed Jun. 30, 2006, now U.S. Pat. No. 7,609,492.

BACKGROUND OF THE INVENTION

Solid state power controllers for controlling the flow of power to various components require a ground fault interrupt to open the power supply if undesired conditions are sensed. The use of such ground fault interrupts is becoming particularly important for solid state power controllers utilized with components in an aircraft.

It is known in a standard ground fault interrupt, that the current on the power supply lines is summed and compared to a maximum. If the summed currents on the several power supply lines exceed a predetermined maximum, then a ground fault interrupt opens to open a circuit and prevent the flow of further power.

Several distinct types of power supplies are commonly utilized. As an example, there are three-phase power supplies both with and without a fourth neutral wire. Further, there are single phase power supplies, or dual phase power supplies. Each of these different types of power supply might be associated with a particular optimum method of sensing a current which should trigger a ground fault interrupt.

SUMMARY OF THE INVENTION

The present invention utilizes a remote sensor on a neutral wire, for any power supplies that incorporate a neutral wire. The current power on the several power lines (e.g., three in a three-phase power supply) is summed. The current sensed by the remote current sensor on the neutral line is subtracted from that summed amount, and the result is compared to a predetermined maximum. If the result is higher than the maximum, then the controller is activated to open the circuit, and interrupt power supply.

The power supply having the neutral line would include not just three-phase power but also a single phase load, which is typically associated with a neutral line. The present invention thus provides an accurate and very reliable method of identifying a situation wherein power supply should be interrupted.

In another feature of this invention, the sensor utilized to sense the line current is a shunt resistor included into the line. The prior art has utilized sensors that are somewhat more complex and expensive, mostly common mode current transformers.

These and other features of the present invention can be best understood from the following specification and drawings, the following of which is a brief description.

BRIEF DESCRIPTION OF THE DRAWINGS

The FIGURE is a schematic view of a power supply for several components such as may be utilized on an aircraft.

DETAILED DESCRIPTION OF THE PREFERRED EMBODIMENT

A complex power supply system 20 is illustrated schematically in the FIGURE. A three-phase generator 22 supplies power to a number of components 24, 25, 28 and 30. These components may be various components such as are found on an aircraft. Examples may be motors, power valves, etc. The four identified components each receive a distinct type of power from the power supply 22. Individual solid state controllers 26, 42 and 60 control the flow of the power to the individual components. Each of the controllers has ground fault interrupt capability, and the controllers disconnect the circuits should conditions indicate that a ground fault condition may be occurring.

The solid state controller 26 incorporates three power supply lines 28, 30 and 32. This controller is not provided with a neutral wire. Each of the lines 28, 30 and 32 are provided with a switch 34 (electromechanical or solid state). A shunt resistor 36 and a sensor 38 are associated with each of the power supply lines 28, 30 and 32. A ground fault line 40 is also associated with one of the power supply lines indicating the potential ground fault path.

In this invention, as power flows to the component 24, the sensors 36 sense the current in each of the three lines 28, 30 and 32. Those three currents are summed by the solid state power controller, and the sum is compared to a maximum. If the sum exceeds that maximum, then a decision is made to open the circuit and utilize the ground fault interrupt feature. The present invention utilizes the shunt resistor as the sensor, and is a simplification over the prior art, mainly using current transformers.

The solid state power controller 42 is associated with a three-phase power line having a neutral wire 50. Here, the power supply lines 44, 46 and 48 are each associated with a shunt resistor sensor 36, along with an interrupt switch 34 as is the case with the controller 26. However, as can be appreciated, a neutral wire 50 is also associated with the three-phase power lines. A remote current sensor 54 including a resistor 52 senses the current in the neutral line 50. The remote current sensor is somewhat intelligent and able to communicate with controller 42. A ground fault 56 bypasses current of the power supply lines to the neutral, without going through the load. In this application, the current sensed in the neutral line is subtracted from the summed currents in the three lines 44, 46 and 48. (The same equation applies to the calculation in the above paragraph, but the neutral wire current is zero.) The resulting number is then compared to a maximum amount, and the switches 34 are opened should the calculated current number exceed the maximum. The present invention provides an accurate and responsive way of identifying a situation at which a ground fault condition should cause an interruption on a three-phase power line having a neutral wire.

The controller 60 is associated with two components 28 and 30. A power supply line 61 is a single phase load and would also be provided with a neutral wire at 62. A ground fault 68 would bypass current from the power line to the neutral without going through the load. A remote current sensor 64 is associated with the neutral line 62. Again, the current sensed by the remote current sensor 64 is subtracted from the current sensed in the line 61. If the remainder exceeds a predetermined maximum, a decision is made that a ground fault condition is occurring.

A two-phase load is also shown powering the component 30 without a neutral wire. The power supply line 70 and 72 have their currents summed as in the prior art and compared to the maximum. Switches 34 are opened should that summed amount exceed the predetermined value.

In sum, the present invention provides a reliable and accurate method of providing a ground fault interrupt function in a complex power supply. On power supplies including a neutral wire, the neutral wire current is utilized along with the current sensing each of the power lines. In another feature, a shunt resistor is utilized to measure the current in each of the power supply lines. Both of these features provide valuable benefits, and may be utilized separate from each other.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A power controller comprising:
   at least one power supply line for transmitting received power to an associated component, said at least one power supply line being provided with a shunt resistor sensor for sensing a current flowing through said at least one power supply line, and the sensed current being compared to a limit, and said controller opening a ground fault interrupt switch should said sensed current exceed said limit; and
   said at least one power supply line includes at least two power supply lines, and each of said at least two power supply lines being provided with an individual shunt resistor sensor sensing the current flowing through an associated power supply line, and the sensed current in each of said power supply lines being summed and then being compared to the limit.

2. The controller as set forth in claim 1, wherein said at least two power supply lines include three power supply lines at three different phases.

3. The controller as set forth in claim 2, wherein a neutral line is associated with said controller, and a current is sensed in the neutral line, and the current sensed in the neutral line is subtracted from the summed currents from said three power supply lines prior to being compared to the limit.

4. The controller as set forth in claim 2, wherein no neutral line is associated with said three power supply lines.

5. A plurality of components associated with an aircraft comprising:
   a plurality of components each being provided with a solid state power controller for supplying power to said plurality of components, at least one of said solid state power controllers including a controller for receiving at least one power supply line, and at least one neutral wire, there being a sensor for sensing current in said at least one power supply line, and a separate sensor for sensing current in said at least one neutral wire, said controller being operable to receive a sensed current in said at least one power supply line, and in said neutral line, and compare the at least two received currents to a predetermined limit, said controller being operable to interrupt power supply to said at least one power supply line should the limit be exceeded;
   said at least one power supply line includes at least two power supply lines, with said at least two power supply lines each being provided with separate sensors;
   said neutral line being provided with a current sensor at a location remote from said controller;
   a resistor associated with said at least one power supply line, and said resistor sensing the current flowing through said at least one power supply line; and
   said controller comparing a difference in the at least two received currents to the predetermined limit.

* * * * *